May 3, 1960 F. E. EKAS 2,935,333
POWER MOWER WITH STEERABLE AND DRIVEN REAR WHEEL
Filed Jan. 3, 1958 2 Sheets-Sheet 1

INVENTOR.
FRANK E. EKAS
BY
McMorrow, Berman & Davidson
ATTORNEYS

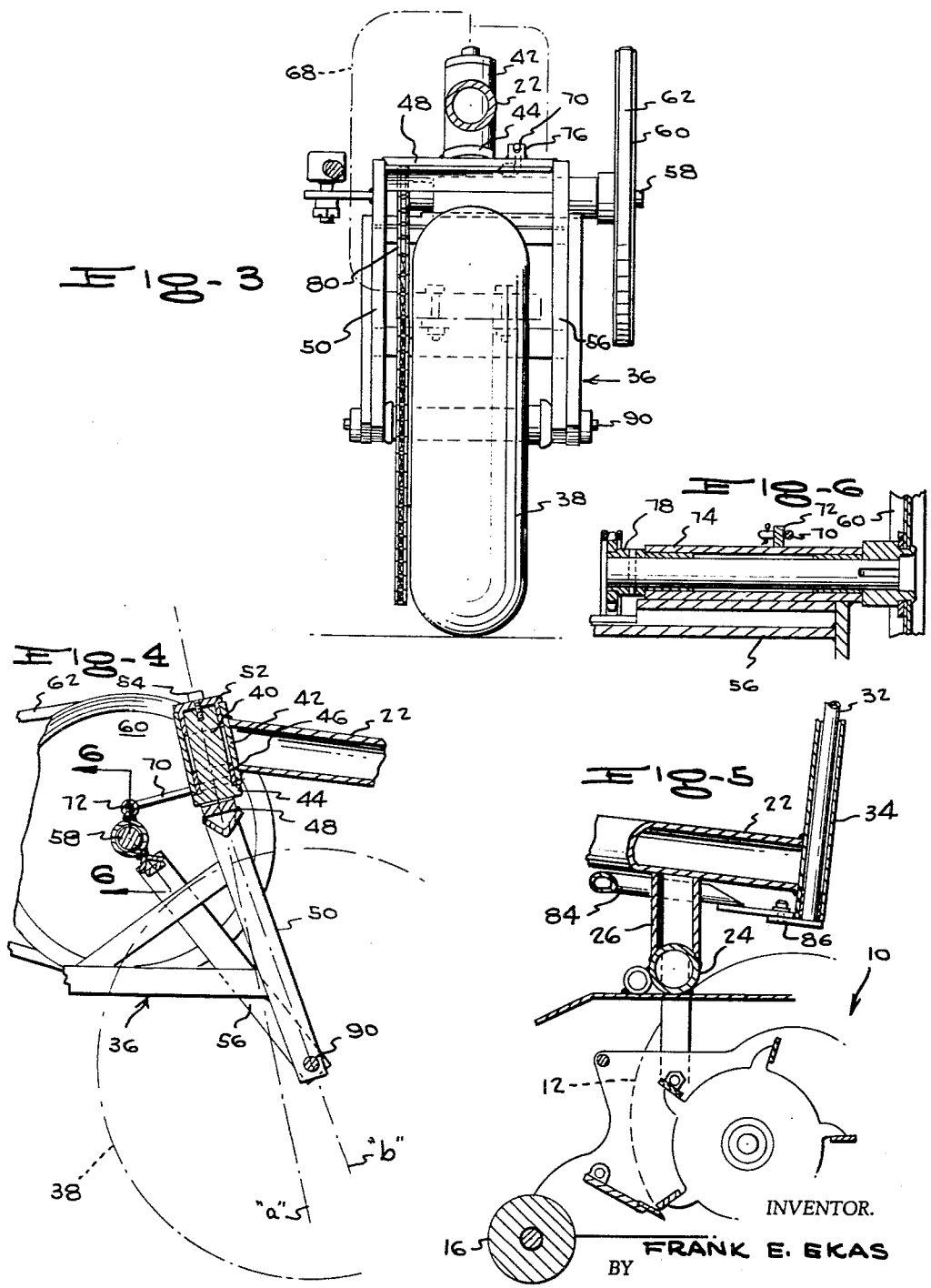

2,935,333

POWER MOWER WITH STEERABLE AND DRIVEN REAR WHEEL

Frank E. Ekas, Sarver, Pa.

Application January 3, 1958, Serial No. 706,953

3 Claims. (Cl. 280—92)

The present invention relates to a power mower with a steerable and driven rear wheel.

An object of the present invention is to provide a riding power mower having a steerable and driven rear wheel which lends itself to easy steering by the operator when seated on the mower.

Another object of the present invention is to provide a riding power mower having a steerable and driven rear wheel which is of sturdy construction, one simple in structure, and one economically feasible.

These and other objects and advantages of the present invention will be fully apparent from the following description when taken in connection with the annexed drawings, in which:

Figure 1 is a plan view of the mower of the present invention, the auxiliary frame and attached power source being shown in full lines in the position in which the mower is movable straightforwardly and shown in dotted lines in a position in which the mower is movable in a turn toward the left, another dotted line showing indicating the position of a mower reel assembly when the mower of the present invention is used to drive multiple mower reels;

Figure 3 is a sectional view, on an enlarged scale, taken on the line 3—3 of Figure 2;

Figure 4 is a sectional view, on an enlarged scale, taken on the line 4—4 of Figure 1;

Figure 5 is a sectional view, on an enlarged scale, taken on the line 5—5 of Figure 1; and Figure 6 is a sectional view taken on the line 6—6 of Figure 4.

Figure 1:
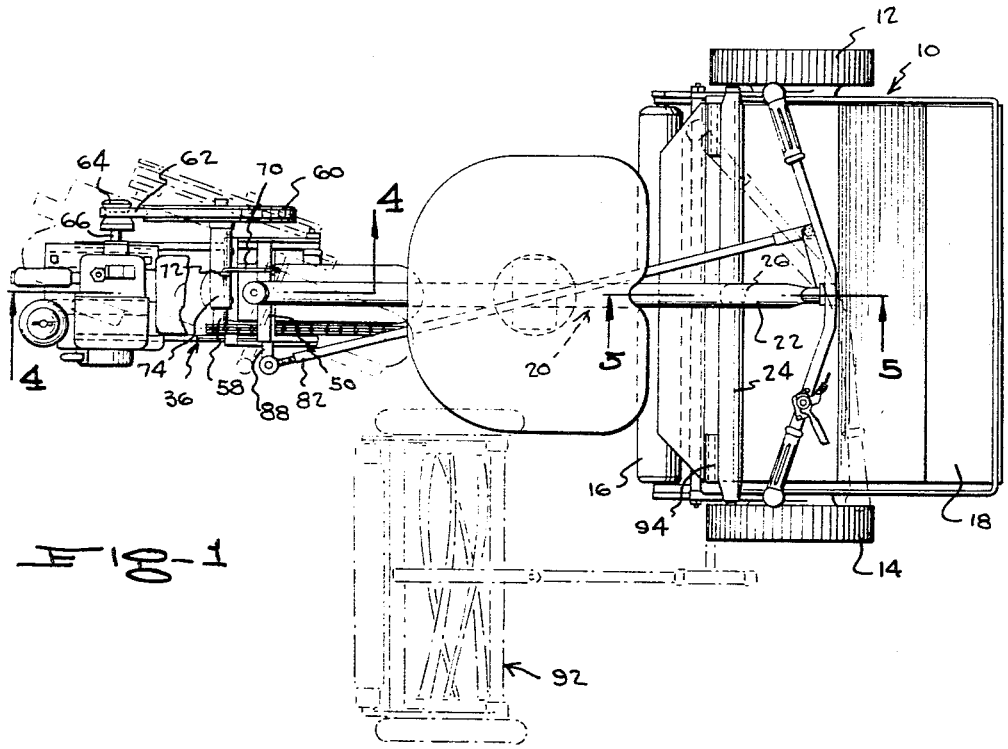
Figure 2:
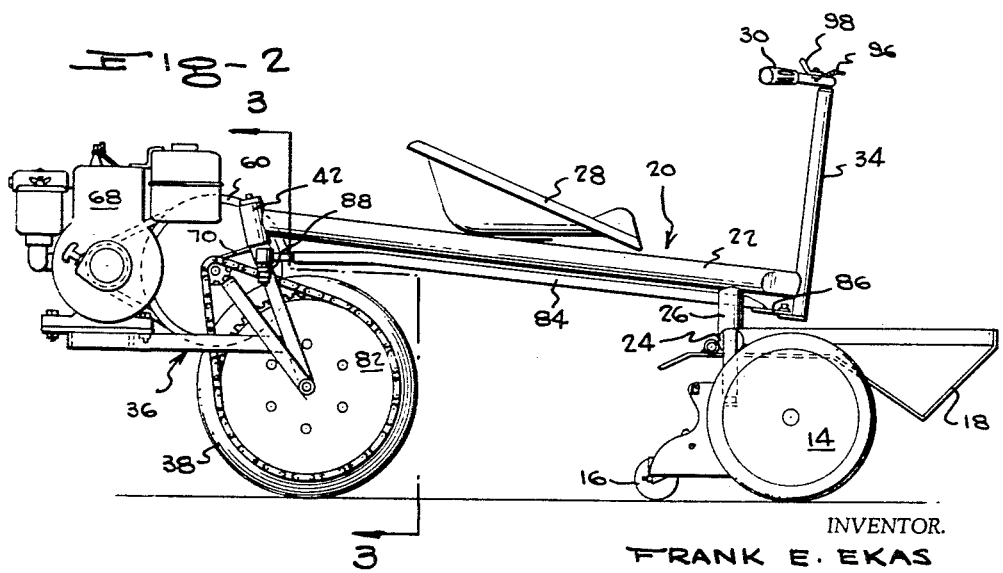
Figure 2 is an elevational view of the assembly shown in Figure 1.

Referring in greater detail to the drawings in which like numerals indicate like parts throughout the several views, the power mower of the present invention comprises a mower assembly, shown in Figures 1 and 2 to be of the reel type although a rotary type may be substituted therefor if desired, the assembly being designated generally by the reference numeral 10 and including a pair of spaced ground-engaging supporting wheels 12 and 14 on each side of the assembly 10 with a transversely arranged roller 16 extending along the rearward end of the assembly 10. A V-shaped foot rest 18 extends transversely of the assembly 10 forwardly of the latter and is supported thereon.

A main frame 20 extends rearwardly from the assembly 10 and is fixedly secured to the main frame 20 consisting in a substantially horizontally disposed tubular member 22 having a forward end and a rearward end with a cross frame member 24 positioned below and spaced from the tubular member 22 inwardly of the forward end of the latter and fixedly connected thereto by means of an upright post member 26 welded or otherwise secured at both of its ends to the tubular member 22 and the cross frame member 24.

An operator seat 28 is positioned above and supported upon the tubular member 22 intermediate the ends of the latter and faces forwardly of the mower assembly. Within reach of an operator's hand when seated upon the seat 28 is a steerable pair of handles 30 mounted upon the upper end of a steering shaft 32 carried within a hollow post 34. The lower end portion of the post 34 is fixedly secured to the forward end of the tubular member 22.

An auxiliary frame 36 is arranged in tandem spaced relation with respect to the main frame 20 and has a steerable driven wheel 38 supporting the auxiliary frame 36.

A shaft 40, disposed at an angle to the vertical, connects the forward end of the auxiliary frame 36 to the rearward end of the main frame 20 for pivotal movement of the auxiliary frame 36 relative to the main frame 20 around or about said shaft as an axis. The shaft is shown in section in Figure 4 to be received within an upwardly sloping sleeve 42 fixedly secured by welding or other means to the rearward end of the tubular member 22. The lower end portion of the shaft 40 is enlarged to provide a collar or shelf 44 abuttingly receiving the lower end of the sleeve 42. A pair of sleeve bearings 46 surround the upper and lower end portions of the shaft 40 and provide a bearing means for contact with the adjacent portions of the shaft 40 so that the shaft 40 rotates freely within the sleeve 42 with a minimum of friction.

The shaft 40 has its enlarged portion or shelf 44 secured to the bight 48 of a U-shaped frame element 50 which has its legs on either side of the wheel 38.

Means is provided for preventing the disconnection of the auxiliary frame from the main frame by the shaft 40 slipping outwardly of the lower end of the sleeve 42 should the main frame be lifted upwardly. Specifically, this means consists in a disc 52 positioned over the upper end of the shaft 40 and of a size to extend over the sleeve 42. A cap screw 54 extends through the disc 52 and is threadedly engaged in a tapped aperture provided in the upper end of the shaft 40.

The sides of the auxiliary frame 36 are secured to the legs of the support element 50, as shown in Figure 4, and a second U-shaped element 56 has its legs positioned within the legs of the support element 50 with the ends of its legs connected to the ends of the legs of the support element 50 for pivotal movement of the element 56 toward and away from the element 50. The bight and element 56 carries the drive shaft 58 of the power source carried by the auxiliary frame 36, there being a pulley 60 on one end of the shaft 58 drivably connected by a belt 62 to a pulley 64 on the end of the motor shaft 66, as shown in Figure 1.

The power source is a portable gasoline motor 68 having its base mounted upon the rearward end portion of the auxiliary frame 36, as shown in Figure 2. Means is provided for tightening the belt 62 and consists in an L-shaped bolt 70 having its short leg extending through an upwardly directed lug 72 arising from the upper portion of the sleeve 74 which carries the shaft 58. The long leg of the bolt 70 has its end portion threaded and received in a nut 76 secured by welding or other means to the bight 48 of the support element 50, as shown in Figure 3. Suitable means such as a cotter pin secures the short leg of the bolt 70 in the lug 72, the pin being removable so that the bolt 70 can be turned into or out of the nut 76 to tighten or lengthen the effective length of the belt 62.

A sprocket wheel 78 is carried on the other end of the shaft 58 and a chain 80 runs over the sprocket wheel 78 and over another sprocket wheel 82 which is operatively connected to the traction wheel 38 for effecting the rotation of the latter upon energization of the motor 68.

A tube 84 has one end connected to the free end of an arm 86 which is carried on the lower end of the steering shaft 32 within the hollow post 34, as shown in Figure 5, and has its other end pivotally connected to the free end of another arm 88 which projects horizontally from one leg of the support element 50, as shown in Figure 1. The tube 84, together with the arms 86 and 88, constitute linkage connecting the rotatable steering shaft 32 to the auxiliary frame 36 for rotation of the auxiliary frame 36 relative to the main frame 20 about the shaft 40 as an axis.

Referring to Figure 4, it will be seen that the axis of rotation of the shaft 40 is shown by a dotted line designated by $a$ whereas the supporting axle 90 of the wheel 38 is transversely positioned upon a line $b$ forwardly of the line $a$ and at a known angle with respect to the line $a$. This provides casters for the wheel 38 and enables the operator when seated upon the seat 28 to steer the auxiliary frame with ease of operation.

In Figure 1 a second reel mower is shown in dotted lines and designated by the reference numeral 92 showing the position of such auxiliary mower if it is to be used with the mower assembly 10. A horizontally disposed sleeve 94 is provided on the frame of the mower assembly 10 for attachment thereto of such auxiliary reel mower 92. A flexible cable assembly 96 controlled by lever 98 mounted near the handles 30 is used to control the speed of the motor 68.

In operation, the operator of the mower of the present invention seats itself upon the seat 28 with the seat resting upon the forward upwardly sloping portion of the foot rest 18 and steers the mower by rotating the steering shaft 32 within the post 34 by means of the handles 30. A rotary type of lawn mower may be substituted for the reel mower here shown.

While only a preferred embodiment of the present invention has been shown and described, other embodiments are contemplated and numerous changes and modifications may be made therein without departing from the spirit of the invention as set forth in the appended claims.

What is claimed is:

1. In a power mower, a mower assembly having ground-engaging supporting wheels, a main frame including a substantially horizontally disposed tubular member having a forward end and a rearward end with a cross frame member positioned below and spaced from the tubular member inwardly of the forward end of the tubular member and an upright post member fixedly securing the forward end of said tubular member to said cross frame member, an auxiliary frame arranged in tandem spaced relation with respect to said main frame, an upwardly sloping sleeve fixedly secured to the rearward end of said main frame tubular member, a shaft freely rotatable within said sleeve connecting the forward end of said auxiliary frame to the rearward end of said main frame for pivotal movement of said auxiliary frame relative to said main frame about said shaft as an axis, a rotatable steering shaft carried by said main frame, and a steering linkage connecting said steering shaft to said auxiliary frame.

2. In a power mower, a mower assembly having ground-engaging supporting wheels, a main frame including a substantially horizontally disposed tubular member having a forward end and a rearward end with a cross frame member positioned below and spaced from the tubular member inwardly of the forward end of the tubular member and an upright post member fixedly securing the forward end of said tubular member to said cross frame member, an auxiliary frame arranged in tandem spaced relation with respect to said main frame, an upwardly sloping sleeve fixedly secured to the rearward end of said main frame tubular member, a shaft freely rotatable within said sleeve connecting the forward end of said auxiliary frame to the rearward end of said main frame for pivotal movement of said auxiliary frame relative to said main frame about said shaft as an axis, said shaft being positioned so that the upper end is adjacent to the forward end of said auxiliary frame and the lower end is adjacent to the rearward end of said main frame, a rotatable steering shaft carried by said main frame, and a steering linkage connecting said steering shaft to said auxiliary frame.

3. In a power mower, a mower assembly having ground-engaging supporting wheels, a main frame including a substantially horizontally disposed tubular member having a forward end and a rearward end with a cross frame member positioned below and spaced from the tubular member inwardly of the forward end of the tubular member and an upright post member fixedly securing the forward end of said tubular member to said cross frame member, an auxiliary frame arranged in tandem spaced relation with respect to said main frame, an upwardly sloping sleeve fixedly secured to the rearward end of said main frame tubular member, a shaft freely rotatable within said sleeve connecting the forward end of said auxiliary frame to said main frame for pivotal movement of said auxiliary frame, a hollow post on the forward end of said main frame tubular member, a rotatable steering shaft mounted in said hollow post, hand actuable means on the upper end of said steering shaft for effecting the rotation of said steering shaft, and steering linkage connecting the lower end of said steering shaft to said auxiliary frame.

References Cited in the file of this patent

UNITED STATES PATENTS

| | | |
|---|---|---|
| 1,557,902 | Thompson | Oct. 20, 1925 |
| 2,710,069 | Johnson | June 7, 1955 |
| 2,765,861 | Ekas | Oct. 9, 1956 |
| 2,792,898 | Mast | May 21, 1957 |
| 2,800,189 | Kummer | July 23, 1957 |